(12) United States Patent
Onuki et al.

(10) Patent No.: US 11,547,958 B2
(45) Date of Patent: Jan. 10, 2023

(54) DISPERSING DEVICE AND DEFOAMING DEVICE

(71) Applicant: ASHIZAWA FINETECH LTD., Narashino (JP)

(72) Inventors: Jiro Onuki, Narashino (JP); Yasuhiro Mitsuhashi, Narashino (JP); Shogo Hatsuzawa, Narashino (JP)

(73) Assignee: ASHIZAWA FINETECH LTD.

( * ) Notice: Subject to any disclaimer, the term of this patent is extended or adjusted under 35 U.S.C. 154(b) by 732 days.

(21) Appl. No.: 16/475,668

(22) PCT Filed: Dec. 25, 2017

(86) PCT No.: PCT/JP2017/046452
§ 371 (c)(1),
(2) Date: Jul. 2, 2019

(87) PCT Pub. No.: WO2018/128114
PCT Pub. Date: Jul. 12, 2018

(65) Prior Publication Data

US 2019/0366239 A1 Dec. 5, 2019

(30) Foreign Application Priority Data

Jan. 5, 2017 (JP) ............................ JP2017-000367

(51) Int. Cl.
*B01D 19/00* (2006.01)
*B01F 33/40* (2022.01)
*B01F 35/71* (2022.01)

(52) U.S. Cl.
CPC ..... *B01D 19/0031* (2013.01); *B01D 19/0068* (2013.01); *B01F 33/40* (2022.01); *B01F 35/71* (2022.01)

(58) Field of Classification Search
None
See application file for complete search history.

(56) References Cited

U.S. PATENT DOCUMENTS 4,940,472 A 7/1990 Hay, II et al.
5,156,586 A 10/1992 Fitch, Jr. et al.
(Continued)

FOREIGN PATENT DOCUMENTS

CN 104903594 A 9/2015
CN 204911372 U 12/2015
(Continued)

OTHER PUBLICATIONS

Supplementary European Search Report for EP Application No. 17889991.0, dated Nov. 28, 2019 (4 pages).
(Continued)

*Primary Examiner* — Christopher P Jones
*Assistant Examiner* — Phillip Y Shao
(74) *Attorney, Agent, or Firm* — Harness, Dickey & Pierce, P.L.C.

(57) ABSTRACT

A dispersing device includes: a casing having a liquid inlet; a rotating body accommodated in the casing and pivotably attached to a rotating shaft from one end of the rotating body; a liquid channel having, on the other end of the rotating body, a passage through which the liquid from the liquid inlet passes, and, inside the rotating body, a segment extended radially around the rotating shaft toward an outer side perpendicular to the rotating shaft and from the other end of the rotating body toward the one end of the rotating body in a direction of the rotating shaft axis and in which a cross section shape perpendicular to the rotating shaft is annular; and one connecting hole in the rotating body connecting the liquid channel with the exterior of the rotating body downstream of the liquid channel.

16 Claims, 9 Drawing Sheets

(56) References Cited

U.S. PATENT DOCUMENTS

| | | | |
|---|---|---|---|
| 5,370,600 | A | 12/1994 | Fitch, Jr. et al. |
| 5,484,383 | A | 1/1996 | Fitch, Jr. et al. |
| 9,618,245 | B2 | 4/2017 | Yokoyama et al. |
| 10,201,789 | B2 | 2/2019 | Ishida et al. |
| 2015/0345840 | A1 | 12/2015 | Yokoyama et al. |
| 2016/0346749 | A1 | 12/2016 | Ishida et al. |

FOREIGN PATENT DOCUMENTS

| | | | |
|---|---|---|---|
| CN | 104096506 | B | 8/2016 |
| FR | 2588778 | A1 | 4/1987 |
| JP | H05-015758 | A | 1/1993 |
| JP | H05501677 | A | 4/1993 |
| JP | H07-204408 | A | 8/1995 |
| JP | H07-313862 | A | 12/1995 |
| JP | H08173826 | A | 7/1996 |
| JP | 2004073915 | A | 3/2004 |
| JP | 2006249966 | A | 9/2006 |
| JP | 201327849 | A | 2/2013 |
| KR | 10-1994-0700143 | | 2/1994 |
| TW | 2015-24590 | A | 7/2015 |

OTHER PUBLICATIONS

Office Action issued in the corresponding Korean Patent Application No. 10-2019-7021942; dated Nov. 18, 2022 (total 17 pages).

195

DISPERSING DEVICE AND DEFOAMING DEVICE

CROSS-REFERENCE TO RELATED APPLICATIONS

This application is a U.S. National Phase Application of International Application No. PCT/JP2017/046452, filed on Dec. 25, 2017, which claims priority to Japanese Application No. 2017-000367, filed on Jan. 5, 2017. The entire disclosures of the above applications are incorporated herein by reference.

BACKGROUND

Technical Field

The present invention relates to a dispersing device for dispersing particles contained in a liquid, and a defoaming device for removing air bubbles contained in a liquid.

Related Art

Heretofore, there has been proposed an agitating, mixing, and dispersing apparatus in which an agitating device having a rotary agitator in an agitation tank, and a gear pump are provided side by side on an upstream side thereof, and a filter device and a defoaming tank are disposed on a downstream side thereof (see Japanese Patent Application Laid-Open Publication No. 2004-073915, for example). In the agitating, mixing, and dispersing apparatus, the agitating device mainly blends and agitates a flowable material. The blended and agitated flowable material is then transferred to the gear pump through a pipe. The gear pump mainly performs a mixing and dispersing process on the flowable material. In this agitating, mixing, and dispersing apparatus, the material having been subjected to the dispersing process is sent to the filter device by the gear pump, sent from the filter device to the defoaming tank by vacuuming, subjected to a defoaming process, and then discharged.

In the above-described agitating, mixing, and dispersing apparatus, however, the dispersing process is performed in the gear pump, and the defoaming process is performed in the defoaming tank. That is, the dispersing process and the defoaming process are performed at separate facilities. Such a configuration increases the number of auxiliary facilities, increases an area occupied by the apparatus, and increases a maintenance burden.

In view of the foregoing circumstances, it is an object of the present invention to provide a dispersing device that has a pump function and can efficiently perform at least a dispersing process and a defoaming process only by the dispersing device itself, and a defoaming device that has a pump function and can efficiently perform a defoaming process.

SUMMARY OF THE INVENTION

The present invention has been made to solve the above-described problems. A dispersing device of the present invention includes: a casing having at least a liquid inlet opening that is an inlet for a liquid; a rotating body that is accommodated in the casing and pivotably attached to a rotating shaft from one end side of the rotating body; a liquid channel constituted of a space that has, on the other end side of the rotating body on an axis of the rotating shaft, a passage opening through which the liquid supplied from the liquid inlet opening passes, and that has, in the interior of the rotating body, a segment that is extended radially around the rotating shaft toward an outer side in a direction perpendicular to the rotating shaft and from the other end side of the rotating body toward the one end side of the rotating body in a direction of the axis of the rotating shaft and in which a shape of a cross section perpendicular to the rotating shaft is annular; and at least one connecting hole provided in the rotating body configured to connect the liquid channel with the exterior of the rotating body on a downstream side of the liquid channel.

In the dispersing device of the present invention, the rotating body, the liquid channel, and the connecting hole together constitute a pump.

In the dispersing device of the present invention, an area of a cross section of the liquid channel perpendicular to the rotating shaft, or an area of a cross section of the liquid channel perpendicular to a channel direction of the liquid channel increases toward the downstream of the liquid channel. That is, a cross-sectional area of the liquid channel in the direction perpendicular to the channel direction of the liquid channel and a cross-sectional area of the liquid channel in the direction perpendicular to the rotating shaft increase toward the one end side of the rotating body in the direction of the axis of the rotating shaft.

In the dispersing device of the present invention, the rotating body includes a first rotating body and a second rotating body that are rotatable around the rotating shaft in an integrated manner; the first rotating body has a hollow space having an end open to the outside; the second rotating body is disposed in the hollow space; the passage opening is formed by an opening of the hollow space; and the liquid channel is constituted of a space formed between an outer circumferential surface of the second rotating body and an inner circumferential surface of the first rotating body.

In the dispersing device of the present invention, the first rotating body is formed in a hollow cylindrical generally circular truncated cone shape, is provided with an opening provided in a base of the cylindrical generally circular truncated cone shape having a smaller diameter, and is provided with at least one hole that penetrates through a circumferential wall having the cylindrical generally circular truncated cone shape; the second rotating body is formed in a generally circular truncated cone shape or a circular cone shape; the passage opening is formed by the opening; the connecting hole is formed by the hole; and the liquid channel has a cylindrical circular truncated cone-shaped space extending toward the one end side of the rotating body in the direction of the axis of the rotating shaft.

In the dispersing device of the present invention, a dimension of a width of an inlet of the cylindrical circular truncated cone-shaped space in a direction orthogonal to the inner circumferential surface of the first rotating body or the outer circumferential surface of the second rotating body is smaller than or equal to approximately 15% of a dimension of a diameter of a base of the first rotating body having a larger diameter, and a dimension of a width of an outlet of the cylindrical circular truncated cone-shaped space in the direction orthogonal to the inner circumferential surface of the first rotating body or the outer circumferential surface of the second rotating body is larger than or equal to approximately 3% of the dimension of the diameter of the base of the first rotating body having the larger diameter.

The dispersing device of the present invention includes an interspace channel constituted of an interspace formed between the rotating body and the casing in a region closer to the one end side of the rotating body in the direction of the axis of the rotating shaft than the connecting hole is, and the casing has a first liquid discharge opening provided at a downstream side of an outlet opening of the interspace channel in a direction along the interspace channel.

In the dispersing device of the present invention, the casing has a second liquid discharge opening provided at a upstream side of an inlet opening of the interspace channel in the direction along the interspace channel.

In the dispersing device of the present invention, the interspace channel includes a segment in which a channel width becomes narrower as approaching to the outlet opening of the interspace channel in the direction along the interspace channel and includes a segment in which projections and depressions are formed on surfaces that constitute the interspace channel.

In the dispersing device of the present invention, the channel width of the interspace channel is in a range of 0.05 to 10 mm.

The dispersing device of the present invention includes a rotating part configured to rotate the rotating body via the rotating shaft, and the rotating part rotates the rotating body at a circumferential velocity in a range of 1 to 200 m/s.

The dispersing device of the present invention includes a divider that extends in a channel width direction of the liquid channel within the liquid channel. Further, the dispersing device of the present invention includes a divider provided across a region between an inner surface and an outer surface of the liquid channel in the direction perpendicular to the rotating shaft. In the dispersing device of the present invention, the divider is formed in such a way as to extend from one end to the other end of the liquid channel along a specific direction in which the liquid channel extends.

A defoaming device of the present invention includes: a casing having at least a liquid inlet opening that is an inlet for a liquid; a rotating body that is accommodated in the casing and pivotably attached to a rotating shaft from one end side of the rotating body; a liquid channel constituted of a space that has, on the other end side of the rotating body on an axis of the rotating shaft, a passage opening through which the liquid supplied from the liquid inlet opening passes, and that has, in the interior of the rotating body, a segment that is extended radially around the rotating shaft toward an outer side in a direction perpendicular to the rotating shaft and from the other end side of the rotating body toward the one end side of the rotating body in a direction of the axis of the rotating shaft and in which a shape of a cross section perpendicular to the rotating shaft is annular; and at least one connecting hole provided in the rotating body for connecting the liquid channel with the exterior of the rotating body on a downstream side of the liquid channel.

Advantageous Effects of Invention

The dispersing device of the present invention can provide advantageous effects such that the dispersing device functions as a pump and can efficiently perform at least a dispersing process and a defoaming process only by the dispersing device itself. The defoaming device can provide advantageous effects such that the defoaming device functions as a pump and can efficiently perform a defoaming process.

DETAILED DESCRIPTION OF THE PREFERRED EMBODIMENTS

An embodiment of the present invention will be described below with reference to the accompanying drawings.

Overall Configuration of Liquid Processing System

Figure 1:
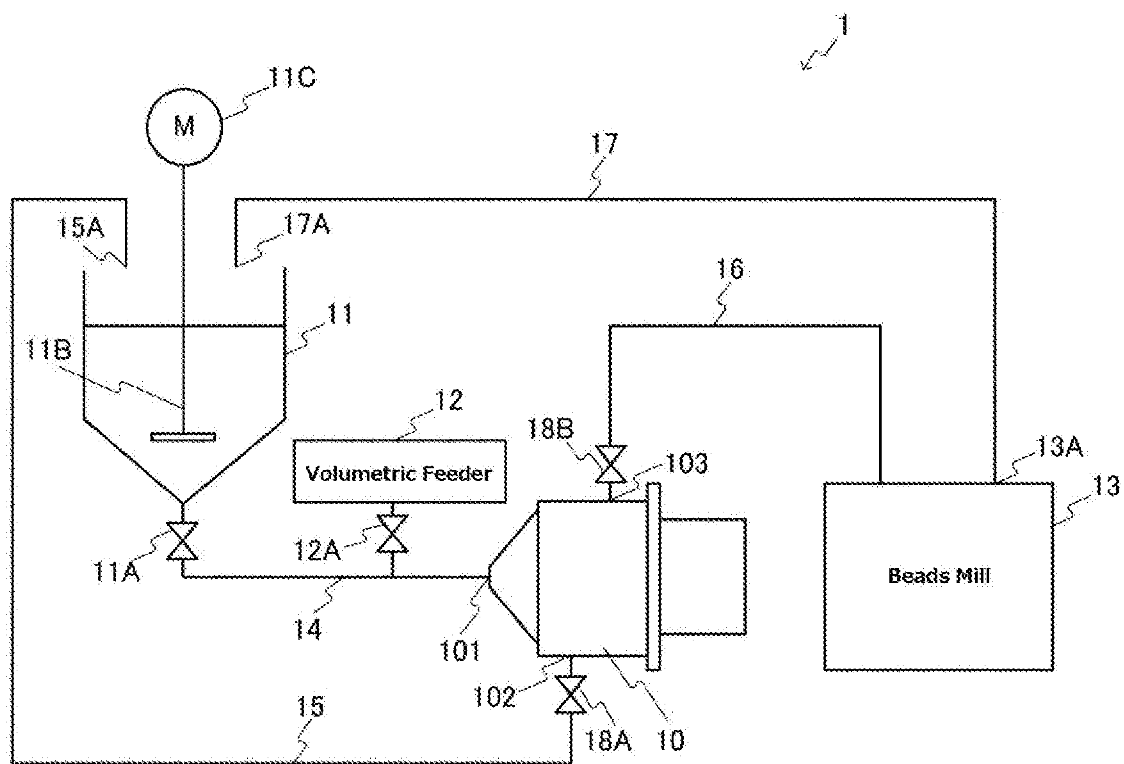
FIG. 1 is a block diagram illustrating a liquid processing system according to an embodiment of the present invention.

With reference to FIG. 1, a liquid processing system 1 in an embodiment of the present invention will be described. The liquid processing system 1 includes: a dispersing device 10; a tank 11; a volumetric feeder 12; a beads mill 13; pipes 14 to 17; and valves 11A, 12A, 18A, and 18B.

The dispersing device 10 is used to perform a dispersing or emulsifying process on a liquid, or the like, supplied through a liquid inlet opening 101, which is an inlet for a liquid, or the like. Note that the liquid, or the like, includes a single kind of liquid, a liquid obtained by mixing different kinds of liquids together, and a slurry in which such a liquid and solid particles are mixed together. While a case in which the liquid, or the like, is a slurry will be described below, the present invention is not limited thereto. The liquid, or the like, may be a single kind of liquid or liquid obtained by mixing different kinds of liquid together.

The dispersing device 10 has a defoaming function of removing air bubbles contained in the supplied slurry. The dispersing device 10 discharges the slurry processed therein from at least one of liquid discharge openings 102 and 103. The dispersing device 10 also has a pump function. This eliminates a need to provide a pump separately for supplying slurry to the dispersing device 10. Thus, the number of auxiliary facilities in the entire liquid processing system 1 can be reduced.

The tank 11 is open at its upper end in a depth direction of the tank 11, and retains a liquid, or the like. The valve 11A is provided at an outlet of the tank 11. The tank 11 is also provided with an agitator 11B that is rotated by a motor 11C.

The volumetric feeder 12, for example, retains particles such as powder therein. The volumetric feeder 12 also has a function to supply a predetermined amount of the particles. The valve 12A is provided at an outlet of the volumetric feeder 12.

The beads mill 13 is a device in which pulverizing media called beads are filled in a container having an agitating device therein. Once a slurry is put into the container and the agitating device is rotated, the beads and a mass of particles in the slurry collide with each other, thereby pulverizing the mass of particles. This makes the particles in the slurry finer and dispersed. Note that the particles in the slurry are supplied by the volumetric feeder 12 in the liquid processing system 1. The liquid retained in the tank 11 at the beginning is mixed with the particles to become a slurry, and the slurry is supplied to the beads mill 13 via the dispersing device 10.

The dispersing device 10 is connected to the tank 11 and the volumetric feeder 12 via the pipe 14. Once the valve 11A and the valve 12A are opened, the liquid and the particles are supplied to the pipe 14 from the tank 11 and the volumetric feeder 12. In the pipe 14, the liquid and the particles are mixed together to become a slurry, and the slurry is supplied to the dispersing device 10.

One end of the pipe 15 having the valve 18A is connected to the liquid discharge opening 102. Once the valve 18A is opened, the slurry flows into the pipe 15. The other end of the pipe 15 is configured as an open end 15A, which is opened. The open end 15A of the pipe 15 is disposed on an upper side of the tank 11 in the depth direction thereof. Thus, the slurry discharged from the dispersing device 10 through the pipe 15 is supplied into the tank 11.

One end of the pipe 16 having the valve 18B is connected to the liquid discharge opening 103. Once the valve 18B is opened, the slurry flows into the pipe 16. The other end of the pipe 16 is connected to the beads mill 13. One end of the pipe 17 is connected to a discharge opening 13A of the beads mill 13. The other end of the pipe 17 is configured as an open end 17A, which is opened. The open end 17A of the pipe 17 is disposed on the upper side of the tank 11 in the depth direction thereof. Thus, the slurry discharged from the beads mill 13 through the pipe 17 is supplied into the tank 11.

Operations of Liquid Processing System

Operations of the liquid processing system 1 will be described next. Once the valve 11A of the tank 11 and the valve 12A of the volumetric feeder 12 are opened, the liquid and the particles are mixed together in the pipe 14 to form a slurry. The slurry is guided to the dispersing device 10 through the pipe 14 by a pumping action of the dispersing device 10. In the dispersing device 10, a predetermined process (defoaming, dispersing, or emulsifying) is performed on the slurry. The slurry having been subjected to the predetermined process is discharged from at least one of the liquid discharge openings 102 and 103 by the pumping action of the dispersing device 10.

To cause the particles in the slurry to have a smaller particle diameter, for example, the valve 18B provided on the liquid discharge opening 103 side is opened to supply the slurry to the beads mill 13. The particles contained in the slurry are pulverized and dispersed by the beads mill 13. This causes the particles contained in the slurry to have a fine particle diameter. The slurry having been subjected to the process in the beads mill 13 described above is returned to the tank 11 again through the pipe 17. Thereafter, the slurry having been subjected to the process described above is further supplied to the dispersing device 10 from the tank 11. By repeatedly performing the above-described operations, the particle diameter of the slurry becomes smaller and smaller.

When more importance is given, for example, on a defoaming process of a slurry, on the other hand, the valve 18A provided at the liquid discharge opening 102 is opened to return the slurry to the tank 11 again. Thereafter, the slurry having been subjected to the above-described process is further supplied to the dispersing device 10 from the tank 11. By repeatedly performing the operations described above, air bubbles contained in the slurry are gradually removed.

As described above, the dispersing device 10 can efficiently perform at least the dispersing process and the defoaming process only by the dispersing device itself. Thus, the dispersing device 10 can efficiently perform the dispersing process and the defoaming process on the slurry. Moreover, since the dispersing device 10 has a pump function, there is no need to provide a pump separately in the dispersing device 10.

Overall Configuration of Dispersing Device

With reference to FIGS. 2 and 3, a specific configuration of the dispersing device 10 according to the embodiment of the present invention will be described next. The dispersing device 10 includes: a casing 100; a rotating body 110; a rotating shaft 120; a rotating part 122 having a rotative power source such as a motor; a liquid channel 130; a connecting hole 140; and an interspace channel 190. Note that no rotative power source such as a motor is shown in the figure.

The casing 100 accommodates the rotating body 110, and has the liquid inlet opening 101 as well as the liquid discharge openings 102 and 103. The liquid inlet opening 101 is an inlet opening for slurry, or the like, to be supplied to the dispersing device 10. The liquid discharge openings 102 and 103 are discharge openings for a slurry, or the like, processed in the dispersing device 10.

Figure 2A:
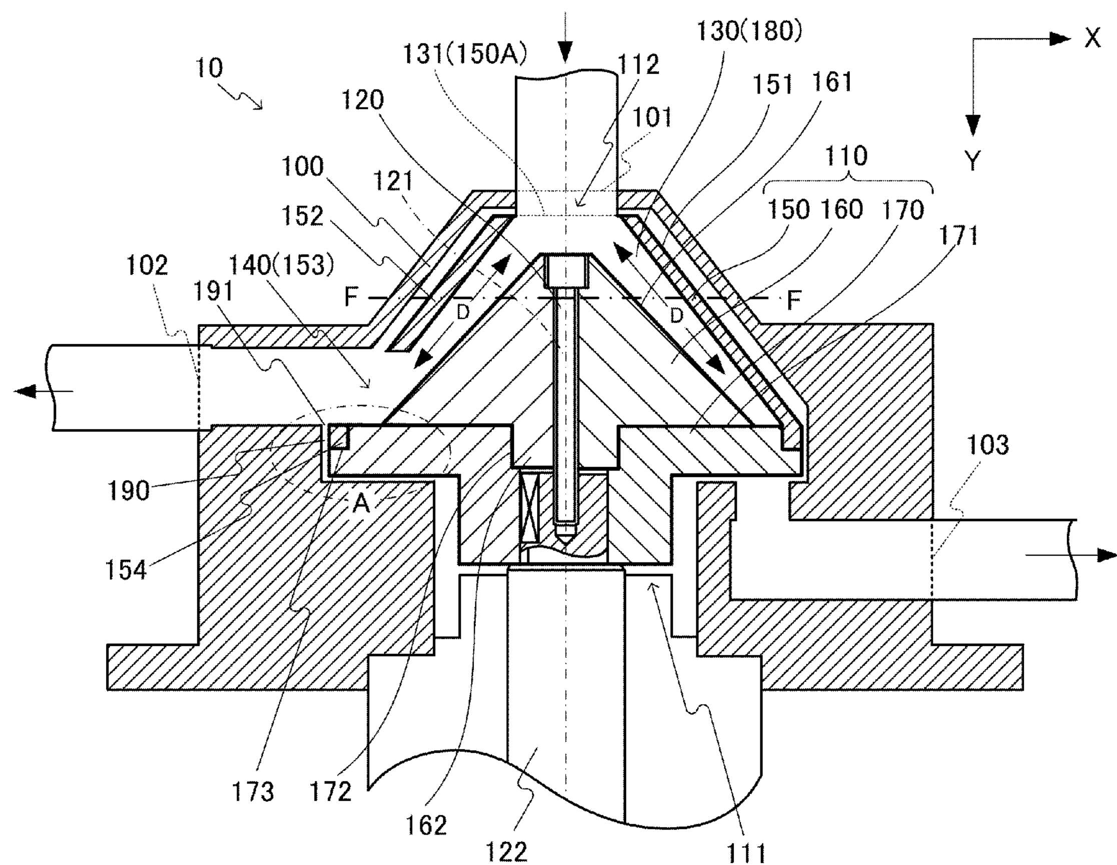
FIG. 2(A) is a cross-sectional view illustrating a dispersing device according to an embodiment of the present invention.

As shown in FIG. 2(A), the rotating body 110 has a circular truncated cone shape. Note that a base of the circular truncated cone shape having a larger diameter is defined as one end 111 of the rotating body 110, and a base of the circular truncated cone shape having a smaller diameter is defined as the other end 112 of the rotating body 110 in the present embodiment. The rotating body 110 is pivotably attached to the rotating shaft 120 from the one end 111 side of the rotating body 110. The rotating shaft 120 is connected to the rotating part 122. Rotative force of the rotating part 122 is transmitted to the rotating shaft 120. The rotating body 110 is rotated by the rotation of the rotating shaft 120.

The liquid channel 130 is a channel provided in the interior of the rotating body 110. The liquid channel 130 is constituted of a space 180 having an annular-cross-section segment that is extended radially around the rotating shaft 120 toward an outer side in a direction perpendicular to the rotating shaft 120 (outer side in a radial direction of the rotating body 110) and from the other end 112 of the rotating body 110 toward the one end 111 of the rotating body 110 in a direction of an axis 121 of the rotating shaft 120 and in which the shape of a cross section perpendicular to the rotating shaft 120 (hereinafter, referred to as a perpendicular-to-rotating-shaft cross section as appropriate) is annular. It is preferable that the space 180 be formed as a single space. The outer side in the direction perpendicular to the rotating shaft 120 in the present embodiment corresponds to the outer side in the radial direction of the rotating body 110, and corresponds to, for example, an X-axis direction in FIG. 2(A). Also, the direction of the axis 121 of the rotating shaft 120 in the present embodiment corresponds to, for example, a Y-axis direction in FIG. 2(A). The annular shape in the present invention encompasses all shapes going around the axis 121 of the rotating shaft 120. Examples of such an annular shape include circular annular shapes, polygonal annular shapes, oval annular shapes, and star annular shapes.

Figure 2B:
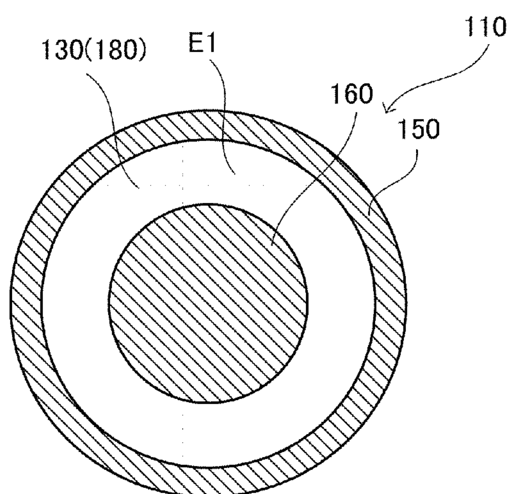
FIG. 2(B) is a cross-sectional view (a view of a perpendicular-to-rotating-shaft cross section) of a liquid channel taken along line F-F in the dispersing device according to the embodiment of the present invention.

As shown in a cross-sectional view of FIG. 2(B) obtained by cutting the rotating body 110 perpendicular to the rotating shaft 120 along line F-F, the liquid channel 130 in the present embodiment has a segment (annular-cross-section segment) in which a perpendicular-to-rotating-shaft cross section E1 of the liquid channel 130 has a circular annular shape. That is, the space 180 that constitutes the liquid channel 130 in the annular-cross-section segment is provided in such a way as to go around the axis 121 of the rotating shaft 120.

Figure 3A:
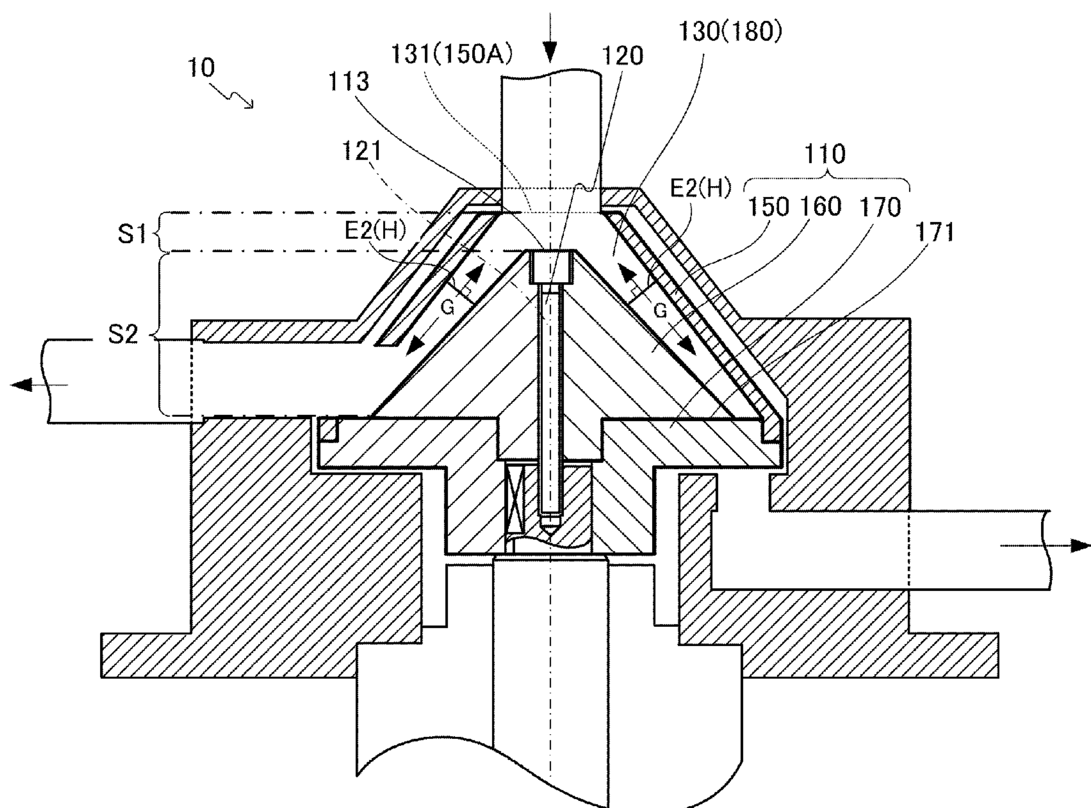
FIG. 3(A) is a cross-sectional view illustrating the dispersing device according to the embodiment of the present invention.
Figure 3B:
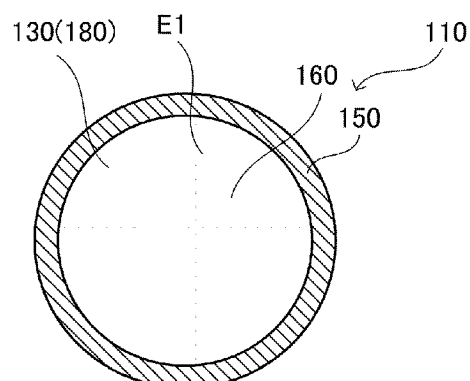
FIG. 3(B) is a view of a perpendicular-to-rotating-shaft cross section of the liquid channel in the vicinity of a passage opening in the dispersing device according to the embodiment of the present invention.

Note that the liquid channel 130 in the present embodiment is divided into: a segment S1 from a passage opening 131 to be described later to an opposed surface 113 in the interior of the rotating body 110 that is opposed to the passage opening 131 (a portion corresponding to the top of a second rotating body 160 to be described below); and a segment S2 extended down from the opposed surface 113 when the liquid channel 130 is segmented along the direction of the axis 121 of the rotating shaft 120 as shown in FIG. 3(A). In the segment S1, the shape of the perpendicular-to-rotating-shaft cross section E1 of the liquid channel 130 is not a circular annulus but a circle as shown in FIG. 3(B). In the segment S2, the shape of the perpendicular-to-rotating-shaft cross section E1 of the liquid channel 130 is a circular annulus as shown in FIG. 2(B). That is, the segment S2 is the above-described annular-cross-section segment. Thus, in this embodiment, the above-described annular-cross-section segment constitutes a section of the liquid channel 130.

Figure 4A:
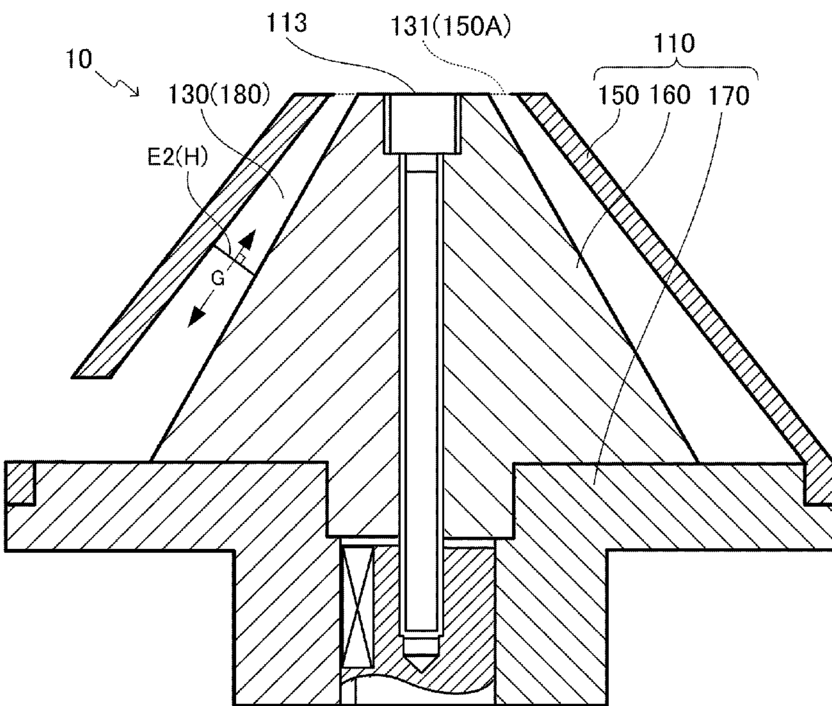
FIGS. 4(A) and 4(B) are cross-sectional views illustrating modifications of the liquid channel in the dispersing device according to the embodiment of the present invention.

When the rotating body 110 is provided in such a way that the opposed surface 113 is disposed on the passage opening 131 as shown in FIG. 4(A), the shape of the perpendicular-to-rotating-shaft cross section E1 in a segment corresponding to the segment S1 in FIG. 3(A) is a circular annulus. In this case, the above-described annular-cross-section segment constitutes the entire region of the liquid channel 130. Thus, the above-described annular-cross-section segment in the present invention may constitute either a section of the liquid channel 130 or the entire region of the liquid channel 130.

Figure 3C:
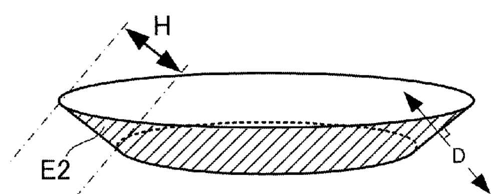
FIG. 3(C) is a perspective view of a cross section of the liquid channel perpendicular to a channel direction of the liquid channel according to the embodiment of the present invention.

It is preferable that a cross-sectional area of the liquid channel 130 (hereinafter, referred to as a liquid channel cross-sectional area) in the annular-cross-section segment become larger toward the downstream side of the liquid channel 130. Note that the liquid channel cross-sectional area refers to an area of a cross section E2 of the liquid channel 130 perpendicular to a channel direction of the liquid channel 130 as shown in FIGS. 3(A) and 3(C). The above-described channel direction refers to an extended direction of the liquid channel 130 (see an arrow G). It is also preferable, in the annular-cross-section segment, that an area of the perpendicular-to-rotating-shaft cross section E1 of the liquid channel 130 (hereinafter, referred to as a liquid channel perpendicular-to-rotating-shaft cross-sectional area), which is shown in FIG. 2(B), become larger as approaching to the one end 111 side from the other end 112 side of the rotating body 110 in the direction of the axis 121 of the rotating shaft 120.

In the present invention, the liquid channel cross-sectional area in the annular-cross-section segment may become smaller toward the downstream side of the liquid channel 130, may be unchanged over the entire region of the annular-cross-section segment, or may be configured to have an aspect in which a segment in which the liquid channel cross-sectional area becomes larger toward the downstream side of the liquid channel 130, a segment in which the liquid channel cross-sectional area becomes smaller toward the downstream side of the liquid channel 130, and a segment in which the liquid channel cross-sectional area is unchanged are alternately and randomly arranged. In the present invention, the liquid channel perpendicular-to-rotating-shaft cross-sectional area in the annular-cross-section segment may become smaller as approaching to the one end 111 side from the other end 112 side of the rotating body 110 in the direction of the axis 121 of the rotating shaft 120, may be unchanged over the entire region of the annular-cross-section segment, or may be configured to have an aspect in which a segment in which the liquid channel perpendicular-to-rotating-shaft cross-sectional area becomes larger as approaching to the one end 111 side from the other end 112 side of the rotating body 110 in the direction of the axis 121 of the rotating shaft 120, a segment in which the liquid channel perpendicular-to-rotating-shaft cross-sectional area becomes smaller, and a segment in which the liquid channel perpendicular-to-rotating-shaft cross-sectional area is unchanged are alternately and randomly arranged.

Figure 4B:
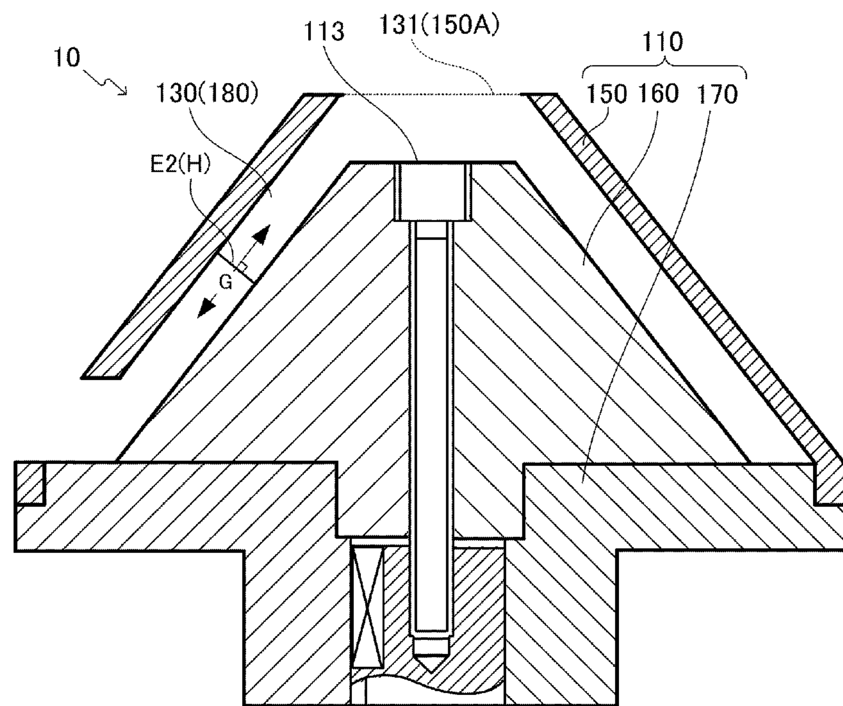

In FIG. 3(A), a width H of the liquid channel 130 in the direction perpendicular to the channel direction in the annular-cross-section segment becomes smaller toward the downstream side of the liquid channel 130. Even in such a case, since the circumferential length of the perpendicular-to-rotating-shaft cross section E1 or the cross section E2 becomes larger toward the downstream side of the liquid channel 130, the area of the perpendicular-to-rotating-shaft cross section E1 or the cross section E2 can become larger toward the downstream side of the liquid channel 130. The width H of the liquid channel 130 in the direction perpendicular to the channel direction in the annular-cross-section segment is not limited to the aspect shown in FIG. 3(A). As shown in FIGS. 4(A) and 4(B), the width H of the liquid channel 130 in the direction perpendicular to the channel direction in the annular-cross-section segment may become larger toward the downstream side of the liquid channel 130 (see FIG. 4(A)), may have an equal value over the annular-cross-section segment (see FIG. 4(B)), or may be configured to have an aspect in which a segment in which the width H becomes larger, a segment in which the width H becomes smaller, and a segment in which the width H is unchanged are alternately and randomly arranged.

Figure 5A:
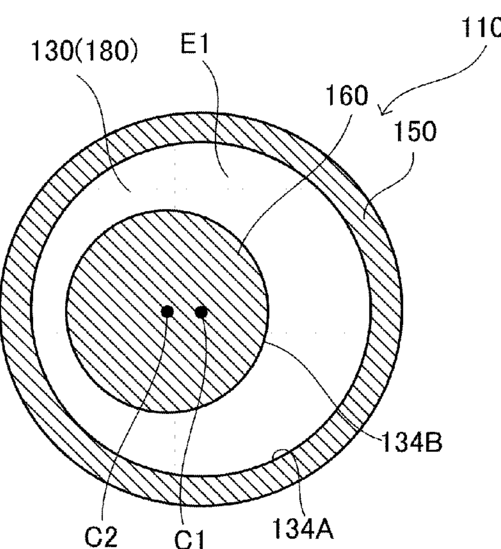
FIGS. 5(A) to 5(C) are a view of a perpendicular-to-rotating-shaft cross section of a liquid channel in the modification of the dispersing device according to the embodiment of the present invention.
Figure 5B:
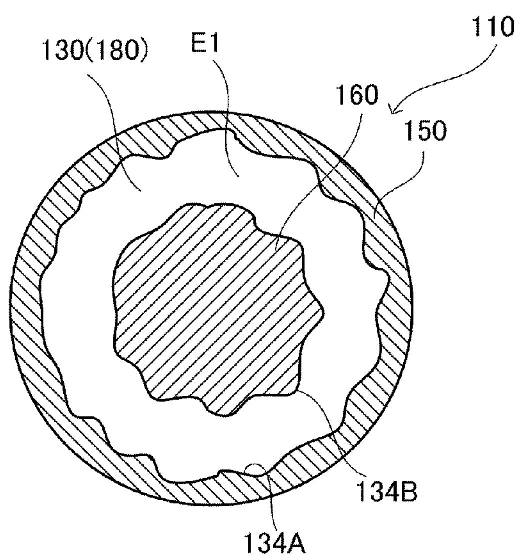
Figure 5C:
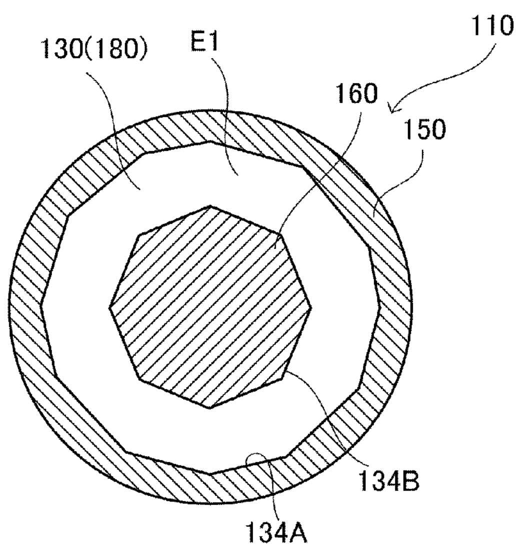

It is only necessary that the shape of the perpendicular-to-rotating-shaft cross section E1 in the annular-cross-section segment be annular. Within such limitation, various shapes can be envisaged. For example, the perpendicular-to-rotating-shaft cross section E1 may have such an annular shape that a center C1 of a circular outer circumference 134A and a center C2 of a circular inner circumference 134B in the liquid channel 130 deviate from each other and the center of the inner circumference 134B is eccentric to the center of the outer circumference 134A as shown in FIG. 5(A). The perpendicular-to-rotating-shaft cross section E1 may have, for example, such an annular shape that the outer circumference 134A and the inner circumference 134B in the liquid channel 130 have a wavy shape as shown in FIG. 5(B). Moreover, the pitch, and the shape and height of a protruding portion in the waves are not limited to any particular values and shape. The perpendicular-to-rotating-shaft cross section E1 may have, for example, such an annular shape that the outer circumference 134A and the inner circumference 134B of the liquid channel 130 each have a polygonal shape as shown in FIG. 5(C). Note that the outer circumference 134A and the inner circumference 134B of the liquid channel 130 may have no identical shape. Furthermore, the perpendicular-to-rotating-shaft cross section E1 may have an annular shape obtained by combining the above-described aspects. The liquid channel 130 may have a different shape of the perpendicular-to-rotating-shaft cross section E1 depending on where the liquid channel 130 is cut.

Figure 6A:
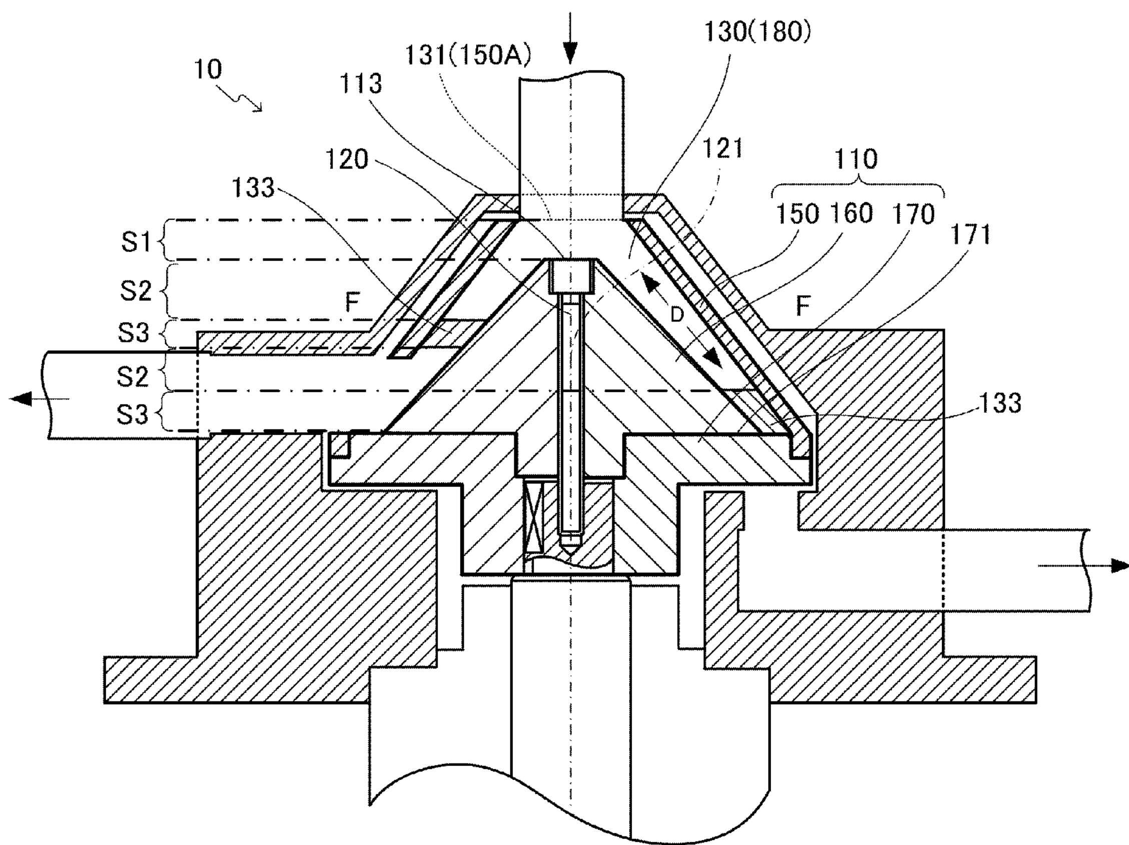
FIG. 6(A) is a cross-sectional view illustrating a modification of the dispersing device according to the embodiment of the present invention.
Figure 6B:
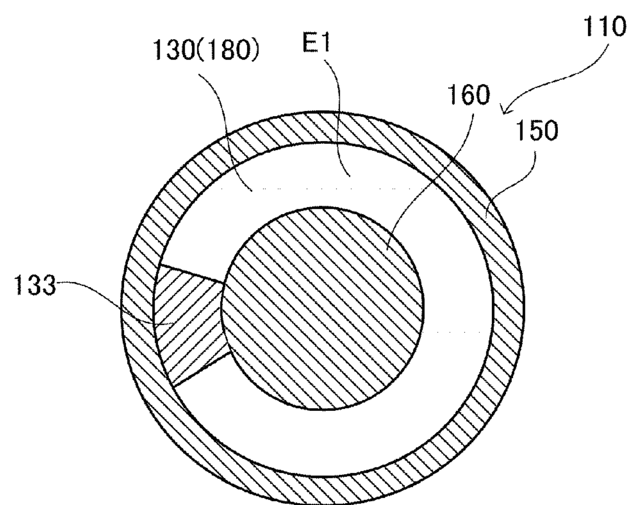
FIG. 6(B) is a view of a perpendicular-to-rotating-shaft cross section of a liquid channel in the modification of the dispersing device according to the embodiment of the present invention.

As shown in FIGS. 6(A) and 6(B), an obstruction 133 for a slurry may be provided in part of a segment S3 of the liquid channel 130. In this case, in the segment S3 of the liquid channel 130 where the obstruction 133 is provided, the perpendicular-to-rotating-shaft cross section E1 of the liquid channel 130 has a shape in which part of an annulus is omitted such as a C-shape or U-shape.

The liquid channel 130 has the passage opening 131 through which the slurry supplied from the liquid inlet opening 101 passes. The passage opening 131 is provided on the axis 121 (see a dot-and-dash line) of the rotating shaft 120 and at an end of the rotating body 110 on the other end 112 side of the rotating body 110.

If the liquid channel 130 have a structure to cause turbulence therein when the rotating body 110 is rotated around the rotating shaft 120, it is difficult for the gas to separate from the slurry. This is because the turbulence prevents the gas from being separated from the slurry by centrifugation. The liquid channel 130, however, is formed as a single space in the interior of the rotating body 110. Thus, turbulence is less likely to occur in the liquid channel 130. This is because surfaces that constitute the liquid channel 130 rotate in the same way as the rotation of the rotating body 110 and thus the surfaces that constitute the liquid channel 130 have no velocity difference. Thus, the single space that constitutes the liquid channel 130 can be regarded as a flow-straightening space for straightening turbulence in fluid flow.

Thus, when the rotating body 110 is rotated around the rotating shaft 120, while the slurry is passing through the liquid channel 130, a liquid component of the slurry moves toward the outer side in the direction perpendicular to the rotating shaft 120 by centrifugal force. Air bubbles in the slurry move toward an inner side in the direction perpendicular to the rotating shaft 120. The air bubbles then gather and merge into a large mass of gas. This makes the air bubbles separated from the slurry. The separated air bubbles move, as the large mass of gas, to the exterior of the rotating body 110 together with the slurry through the connecting hole 140 to be described later.

Note that an excessively high circumferential velocity of the rotating body 110 in separating the air bubbles as described above raises the temperature of the rotating body 110. An excessively low circumferential velocity of the rotating body 110, on the other hand, results in deteriorated dispersing and defoaming effects. In consideration of such balance, the rotating body 110 is preferably rotated at a circumferential velocity in a range of 1 to 200 m/s, the rotating body 110 is more preferably rotated at a circumferential velocity in a range of 5 to 150 m/s, and the rotating body 110 is most preferably rotated at a circumferential velocity in a range of 10 to 100 m/s.

When the liquid channel cross-sectional area gradually increases from the upstream side toward the downstream side in the liquid channel 130 (or as the liquid channel perpendicular-to-rotating-shaft cross-sectional area gradually increases from the other end 112 side toward the one end 111 side of the rotating body 110 in the direction of the axis 121 of the rotating shaft 120), an air resistance against slurry per unit volume, for example, becomes larger. Thus, the flow velocity of the slurry decreases toward the downstream side of the liquid channel 130. This further enhances the flow-straightening effect and increases an amount of time during which the slurry stays in the liquid channel 130. Consequently, turbulence is further less likely to occur in the liquid channel 130. Moreover, an amount of time taken for a passage of the slurry through the liquid channel 130 increases, thereby making it possible to separate more air bubbles than in the conventional techniques. When the liquid channel cross-sectional area (or the liquid channel perpendicular-to-rotating-shaft cross-sectional area) is constant or gradually decreases, on the other hand, an air resistance against slurry per unit volume, for example, becomes smaller. Thus, the flow velocity of the slurry increases toward the downstream side of the liquid channel 130. This promotes the occurrence of turbulence in the liquid channel 130. Since turbulence disturbs the separation of the gas from the slurry as described above, the occurrence of the turbulence deteriorates the defoaming effect.

The connecting hole 140 is a hole provided in the rotating body 110 and connects the liquid channel 130 and the exterior of the rotating body 110 on the downstream side of the liquid channel 130. At least one connecting hole 140 is provided.

As shown in a region A in FIG. 2(A), the interspace channel 190 is constituted of an interspace formed between the rotating body 110 and the casing 100 in a region closer to the one end 111 of the rotating body 110 in the direction of the axis 121 of the rotating shaft 120 than the connecting hole 140 is. A shear force is exerted on the slurry passing through the interspace channel 190. The shear force disperses and pulverizes particles in the slurry, thus making the particles in the slurry finer. Note that a channel width of the interspace channel 190 is preferably in a range of 0.05 to 10 mm, more preferably in a range of 0.1 to 5 mm, and most preferably in a range of 0.5 to 2 mm in order to obtain sufficient shear force.

Figure 7A:
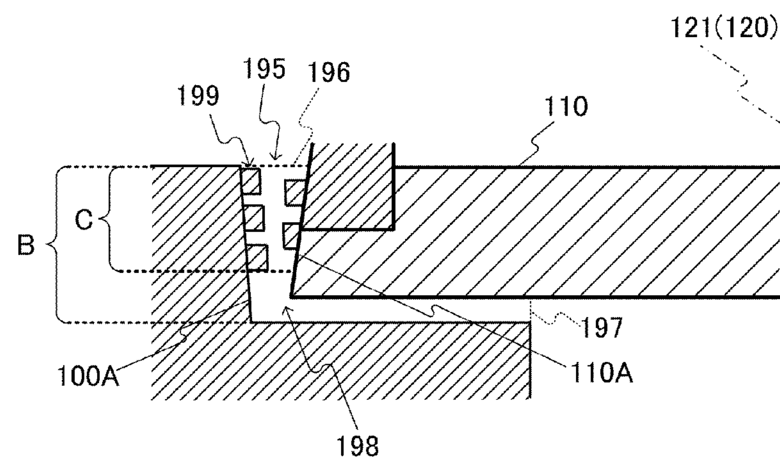
FIG. 7(A) is a cross-sectional view illustrating a first modification of an interspace channel according to the embodiment of the present invention.

In order to further facilitate the dispersion and pulverization of the particles in the slurry, the interspace channel 190 may be replaced with an interspace channel 195 shown in FIG. 7(A). The interspace channel 195 has a segment B in which a channel width becomes narrower as approaching to an outlet opening 197 of the interspace channel 195 in an interspace channel direction along the interspace channel 195. Specifically, the channel width of the interspace channel 195 becomes gradually narrower in a segment from an inlet opening 196 to a bent portion 198 as shown in FIG. 7(A). The channel width is constant over a region from the bent portion 198 to the outlet opening 197.

Note that the interspace channel 195 may be configured in such a way that the channel width thereof gradually decreases over the entire region. The interspace channel 195 may also have a plurality of segments in each of which the channel width gradually decreases.

The interspace channel 195 also has a segment C in which projections and depressions 199 are formed on surfaces that constitute the interspace channel 195 (a surface 110A of the rotating body 110 and a surface 100A of the casing 100, the same applies hereinafter). The segment C refers to a segment extending from the inlet opening 196 to a point before the bent portion 198 in the channel direction. The projections and depressions 199 are provided so that the particles in the slurry passing through the interspace channel 195 are ground and pulverized by the projections, and the like, on the surfaces that constitute the interspace channel 195. Specifically, the projections and depressions 199 are provided, for example, in such a way that the depressed portions and the projected portions are alternately arranged in the channel direction along which the interspace channel 195 extends on each of the surfaces that form the interspace channel 195 as shown in FIG. 7(A). The projections and depressions 199 provided on the surfaces that form the interspace channel 195 face each other in the direction perpendicular to the rotating shaft 120 (the axis 121). The depressed portions and the projected portions in the projections and depressions 199 are provided in such a way as to go around in the circumferential direction of the surface 110A of the rotating body 110 and the surface 100A of the casing 100 that faces the surface 110A.

Note that the interspace channel 195 may be configured in such a way that the projections and depressions 199 are provided over the entire region of the interspace channel 195. The interspace channel 195 may also have a plurality of segments in each of which the projections and depressions 199 are provided.

Figure 7B:
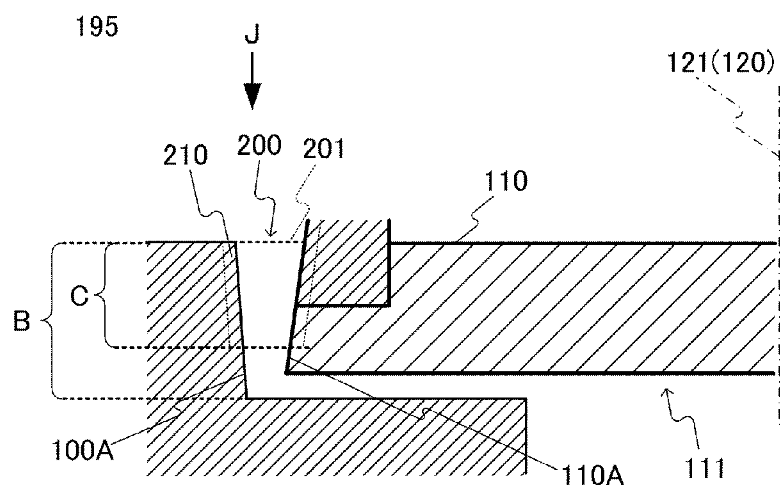
FIG. 7(B) is a cross-sectional view illustrating a second modification of the interspace channel according to the embodiment of the present invention
Figure 7C:
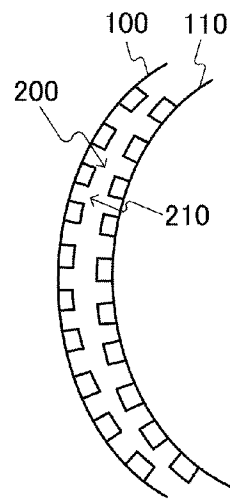
FIG. 7(C) is a plan view illustrating the second modification of the interspace channel.

The interspace channel 190 may be replaced with an interspace channel 200 shown in FIGS. 7(B) and 7(C). The interspace channel 200 is much the same as the interspace channel 195, but has a different aspect of projections and depressions. Note that FIG. 7(C) is a view when the interspace channel 200 is seen from the side of an arrow J directed from the other end 112 side toward the one end 111 side of the rotating body 110 in the direction of the axis 121.

As shown in FIG. 7(B), the interspace channel 200 is provided with projections and depressions 210 formed in a segment C on surfaces that form the interspace channel 200. As shown in FIG. 7(C), the projections and depressions 210 are provided in such a way that depressed portions and projected portions are alternately arranged in the circumferential direction of the rotating body 110 on each of the surfaces that form the interspace channel 200. The projections and depressions 210 provided on the surfaces that form the interspace channel 200 face each other in the direction perpendicular to the rotating shaft 120 (the axis 121). The depressed portions and the projected portions in the projections and depressions 210 go around, while being alternately arranged, in the circumferential direction of the surface 110A of the rotating body 110 and the surface 100A of the casing 100 that faces the surface 110A. The depressed portions and the projected portions in the projections and depressions 210 run in a channel direction along which the interspace channel 200 extends only by a length of the segment C from an inlet opening 201.

The liquid discharge opening 102 is provided at a upstream side of an inlet opening 191 of the interspace channel 190 in the direction along the interspace channel 190. The liquid discharge opening 103 is provided at a downstream side of an outlet opening 192 of the interspace channel 190 in the direction along the interspace channel 190. The liquid discharge opening 102 is provided for directly discharging the slurry having passed through the connecting hole 140 to the outside. The liquid discharge opening 103 is provided for discharging the slurry having passed through the connecting hole 140 and the interspace channel 190 to the outside.

Specific Configuration of Rotating Body

Next, the specific configuration of the rotating body 110 according to the embodiment of the present invention will be described below with reference to FIGS. 2 and 8. The rotating body 110 is constituted of a first rotating body 150, a second rotating body 160, and a third rotating body 170 that are rotatable around the rotating shaft 120 in an integrated manner.

The first rotating body 150 has a hollow space having an end open to the outside. The opening of the hollow space constitutes the passage opening 131. Specifically, the first rotating body 150 is formed in a hollow cylindrical generally circular truncated cone shape. In the first rotating body 150, an opening 150A is provided in the base of the cylindrical generally circular truncated cone shape having a smaller diameter. The opening 150A constitutes the passage opening 131.

Figure 8A:
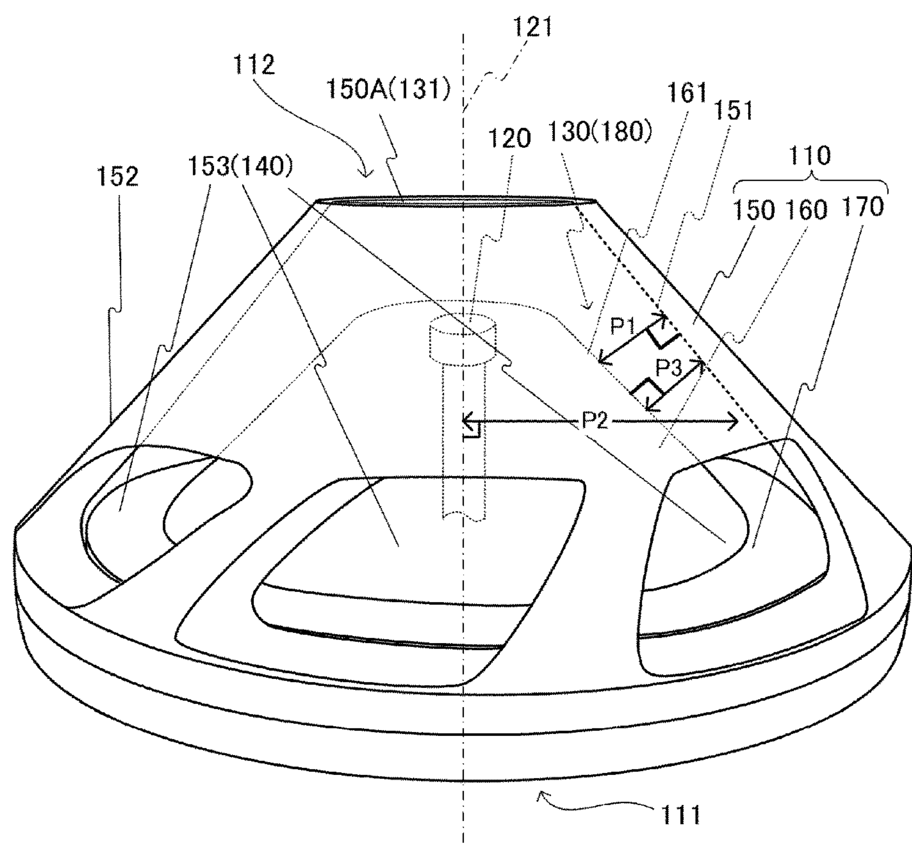
FIG. 8(A) is a perspective view illustrating a rotating body according to the embodiment of the present invention.

The first rotating body 150 is provided with a plurality of holes 153 penetrating through a circumferential wall 152 having a cylindrical generally circular truncated cone shape. The holes 153 each penetrate through the circumferential wall 152 in a generally quadrangular shape as shown in FIG. 8(A). The holes 153 are provided at regular intervals in the circumferential direction of the circumferential wall 152. The holes 153 are provided in the vicinity of the base of the cylindrical generally circular truncated cone shape having a larger diameter. The holes 153 constitute the connecting holes 140. It is only necessary that at least one hole 153 be provided.

The second rotating body 160 is disposed in the hollow space inside the first rotating body 150. Specifically, the second rotating body 160 is formed in a generally circular truncated cone shape (or a circular cone shape). A projected portion 162 projected in a height direction of the second rotating body 160 is provided on a base of the second rotating body 160 having a larger diameter. The second rotating body 160 is provided with a through hole penetrating through the center of the generally circular truncated cone shape in the height direction of the second rotating body 160. The second rotating body 160 is pivotably attached to the rotating shaft 120 through the through hole.

The third rotating body 170 is a seating on which the first rotating body 150 and the second rotating body 160 are placed. The first rotating body 150 and the second rotating body 160 are fixed while being placed on the third rotating body 170. The third rotating body 170 has such a shape that two discs having different diameters are stacked in two layers with their centers coinciding with each other. The first rotating body 150 and the second rotating body 160 are placed on a surface 171 of the disc of the third rotating body 170 having a larger diameter.

Depressed portions 172 and 173 are provided on the surface 171 side of the third rotating body 170. The projected portion 162 of the second rotating body 160 is engaged with the depressed portion 172. An end 154 of the first rotating body 150 is engaged with the depressed portion 173. The third rotating body 170 is provided with a through hole penetrating through the disc centers in the layered direction of the discs. The third rotating body 170 is pivotably attached to the rotating shaft 120 through the through hole.

As described above, the first rotating body 150, the second rotating body 160, and the third rotating body 170 are configured to be rotatable around the rotating shaft 120.

As shown in FIG. 2, the first rotating body 150 and the second rotating body 160 are disposed in such a way that their central axes in their height direction coincide with each other. Moreover, the first rotating body 150, the second rotating body 160, and the rotating shaft 120 are provided in such a way that the central axes of the first rotating body 150 and the second rotating body 160 in their height direction coincide with the axis 121 of the rotating shaft 120.

Specific Configuration of Liquid Channel

Figure 8B:
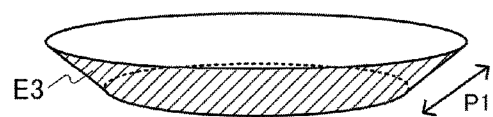
FIG. 8(B) is a cross-sectional view of the liquid channel cut along a direction orthogonal to an inner circumferential surface of a first rotating body according to the embodiment of the present invention.
Figure 8C:
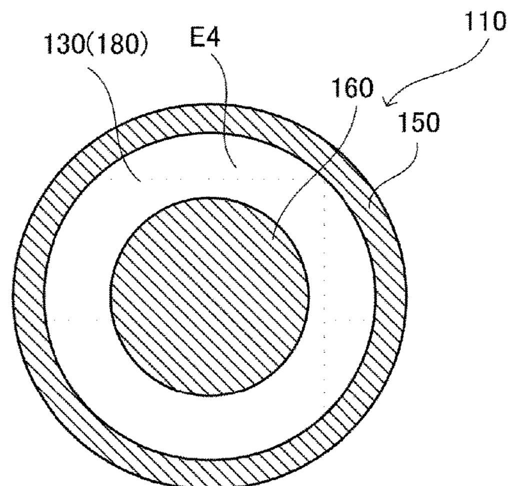
FIG. 8(C) is a cross-sectional view of the rotating body perpendicular to a rotating shaft according to the embodiment of the present invention.

Next, the specific configuration of the liquid channel 130 according to the embodiment of the present invention will be described below with reference to FIGS. 2, 8, and 9. The liquid channel 130 is constituted of the space 180 formed between an outer circumferential surface 161 of the second rotating body 160 and an inner circumferential surface 151 of the first rotating body 150. It is preferable that the space 180 be formed as a single space. The space 180 is formed in a cylindrical circular truncated cone shape extending toward the one end 111 of the rotating body 110 in the direction of the axis 121 of the rotating shaft 120. In addition to the above-described liquid channel cross-sectional area, an area of a cross section E3 (see the circumferential surface of FIG. 8(B)) of the space 180 cut in a direction P1 orthogonal to the inner circumferential surface 151 of the first rotating body 150 (or a direction P3 orthogonal to the outer circumferential surface 161 of the second rotating body 160) gradually increases toward the one end 111 of the rotating body 110 in the direction of the axis 121 of the rotating shaft 120, as shown in FIGS. 8(A) and 8(B). A cross section E4 (see FIG. 8(C)) of the space 180 perpendicular to the rotating shaft 120 has an annular shape. An area of the annular cross section E4 of the space 180 increases toward the one end 111 in the direction of the axis 121 of the rotating shaft 120.

Figure 9:
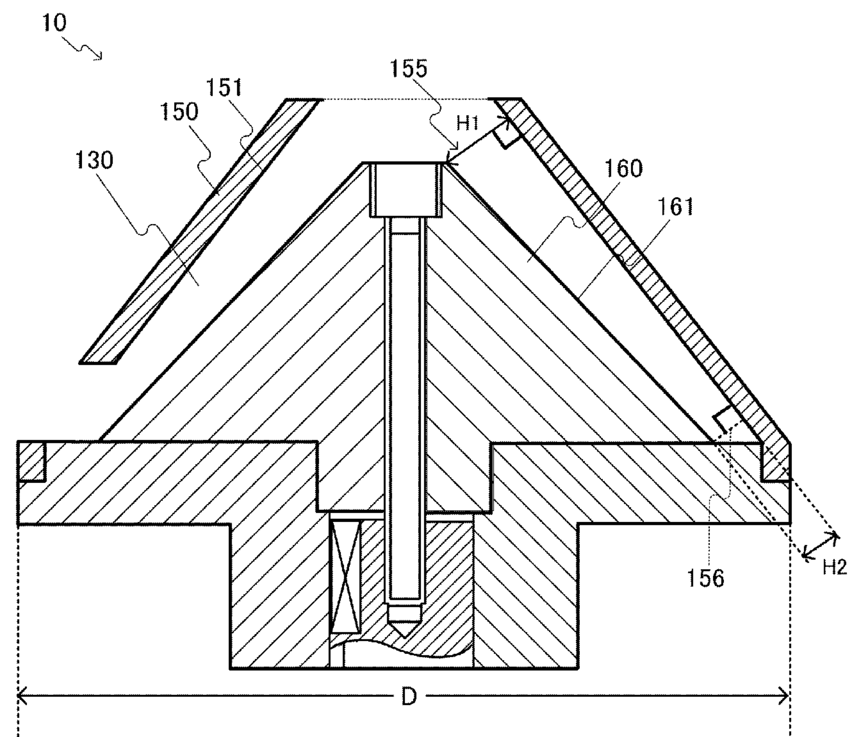
FIG. 9 is a cross-sectional view of the rotating body according to the embodiment of the present invention.

To obtain such a configuration, it is only necessary that a dimension H1 of the width of an inlet 155 of the cylindrical circular truncated cone-shaped space in the direction orthogonal to the inner circumferential surface 151 of the first rotating body 150 be smaller than or equal to approximately 15% of a dimension D of the diameter of the base of the first rotating body 150 having a larger diameter, and a dimension H2 of the width of an outlet 156 of the cylindrical circular truncated cone-shaped space in the direction orthogonal to the inner circumferential surface 151 of the first rotating body 150 be larger than or equal to approximately 3% of the dimension D of the diameter of the base of the first rotating body 150 having a larger diameter, as shown in FIG. 9. Note that the aforementioned configuration can be similarly applied to dimensions of widths of the inlet 155 and the outlet 156 of the cylindrical circular truncated cone-shaped space in the direction perpendicular to the channel direction of the liquid channel 130 and dimensions of widths of the inlet 155 and the outlet 156 of the cylindrical circular truncated cone-shaped space in the direction orthogonal to the outer circumferential surface 161 of the second rotating body 160. Moreover, the aforementioned configuration can be similarly applied to dimensions of widths of the inlet 155 and the outlet 156 of the cylindrical circular truncated cone-shaped space in the direction orthogonal to a circumferential surface of a circular truncated cone shape formed between the inner circumferential surface 151 of the first rotating body 150 and the outer circumferential surface 161 of the second rotating body 160.

About Pump Function

According to the thus configured dispersing device 10 described above, the rotating body 110, the liquid channel 130, and the connecting hole 140 together constitute a pump. Once the liquid channel 130 is rotated together with the rotating body 110, a slurry and air bubbles eventually, in a separated state, pass through the connecting hole 140 and move to the exterior of the rotating body 110 by centrifugal force.

Here, a pressure difference is generated between the vicinity of the connecting hole 140 of the rotating body 110, which is under high pressure due to the centrifugal force, and the liquid discharge openings 102 and 103. This pressure difference moves the slurry having passed through the connecting hole 140 to the liquid discharge openings 102 and 103. The movement of the slurry leads to the rapid flowing-in of the slurry from the passage opening 131. As described above, the slurry is suctioned into and discharged from the dispersing device 10 by the rotation of the rotating body 110, the liquid channel 130, and the connecting hole 140 in an integrated manner. That is, the rotating body 110, the liquid channel 130, and the connecting hole 140 function as a pump by rotating in an integrated manner.

Specific Configuration of Interspace Channel

Next, the specific configuration of the interspace channel 190 according to the embodiment of the present invention will be described below with reference to FIG. 2. As shown in the region A of FIG. 2(A), there is provided the interspace channel 190 constituted of an interspace formed between the end of the first rotating body 150 and the disc of the third rotating body 170 having a larger diameter, and the casing 100. The interspace channel 190 has an L-shaped cross section in the direction of the axis 121. The slurry passing through the interspace channel 190 moves toward the liquid discharge opening 103 to be discharged to the outside.

Operations of Dispersing Device

As described above, the slurry having passed through the passage opening 131 moves into the liquid channel 130. When the rotating body 110 rotates around the rotating shaft 120, the slurry moves toward the outer side in the radial direction (the direction perpendicular to the axis 121 of the rotating shaft 120, the same applies hereinafter) and toward the downstream of the liquid channel 130. The air bubbles, on the other hand, move toward an inner side in the radial direction and toward the downstream of the liquid channel 130. The air bubbles moving toward the inner side in the radial direction gather and merge into a mass of gas having a predetermined size. This makes the air bubbles separated from the slurry.

Note that the direction perpendicular to the axis 121 of the rotating shaft 120 in the above description can be interchangeably read as the radial direction as appropriate.

The slurry from which the air bubbles have been separated passes through the connecting hole 140 and moves to the exterior of the rotating body 110. Herein, when a user wishes to mainly use the function of separating air bubbles rather than the dispersing function in the dispersing device 10, the valve 18A on the liquid discharge opening 102 side is opened and the valve 18B on the liquid discharge opening 103 side is closed. This causes large part of the slurry to be discharged from the liquid discharge opening 102 without moving into the interspace channel 190. If the slurry passes through the interspace channel 190, the pumping power of the dispersing device 10 is lowered. Thus, the dispersing device 10 operated as described above can take in and discharge slurry rapidly and in high volume.

When a user wishes to mainly use the dispersing function in the dispersing device 10, on the other hand, the valve 18A on the liquid discharge opening 102 side is closed and the valve 18B on the liquid discharge opening 103 side is opened conversely to the above. This causes the slurry to be subjected to the dispersing process in the interspace channel 190 and discharged from the liquid discharge opening 103.

Modification of Dispersing Device

Figure 10:
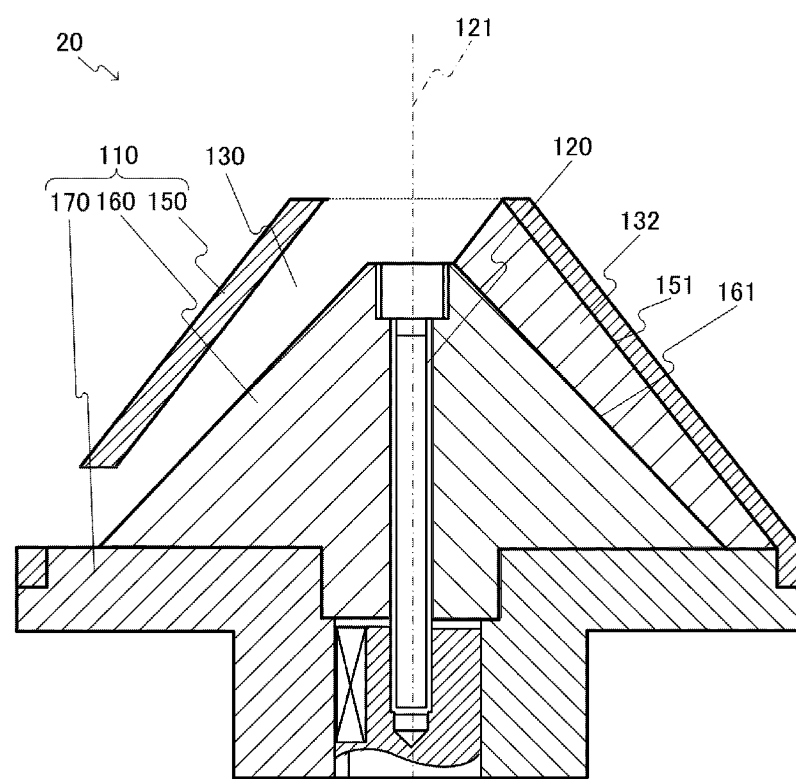
FIG. 10 is a cross-sectional view of a rotating body according to another embodiment of the present invention.

With reference to FIG. 10, a dispersing device 20 according to another embodiment of the present invention will be described. The dispersing device 20 is obtained by adding a divider 132 to the dispersing device 10. As shown in FIG. 10, the divider 132 divides the space 180 that constitutes the liquid channel 130 and extends in a channel width direction of the liquid channel 130. While an exemplary shape of the divider 132 is a plate or a column, any other shape may be employed without being limited thereto.

The divider 132 is provided across a region between an inner surface and an outer surface of the liquid channel 130 in the direction perpendicular to the rotating shaft 120. That is, the divider 132 is provided across the region between the inner circumferential surface 151 of the first rotating body 150 and the outer circumferential surface 161 of the second rotating body 160.

Moreover, the divider 132 extends from one end (upstream end) to the other end (downstream end) of the liquid channel 130 along a specific direction in which the liquid channel 130 extends (specific extended direction). The divider 132 divides the space 180 that constitutes the liquid channel 130 into two spaces. Note that a divider not extending from the one end to the other end of the liquid channel 130 is also included in the scope of the present invention.

A divider may not be provided across the region between the inner surface and the outer surface of the liquid channel 130 in the direction perpendicular to the rotating shaft 120 as long as the divider extends in the channel width direction of the liquid channel 130. That is, the divider may be formed in such a way as to extend partway from the inner surface (the outer circumferential surface 161 of the second rotating body 160) toward the outer surface (the inner circumferential surface 151 of the first rotating body 150) of the liquid channel 130 in the direction perpendicular to the rotating shaft 120. The divider may also be formed in such a way as to extend partway from the outer surface (the inner circumferential surface 151 of the first rotating body 150) toward the inner surface (the outer circumferential surface 161 of the second rotating body 160) of the liquid channel 130 in the direction perpendicular to the rotating shaft 120.

While one divider 132 is provided in the dispersing device 20, the present invention is not limited thereto. A plurality of dividers 132 may be provided at regular intervals (or at random intervals) along the circumferential direction of the first rotating body 150 and the second rotating body 160, for example. When the space 180 is divided by the plurality of dividers 132, the liquid channel 130 is constituted of a plurality of spaces.

The dispersing device 10 can be regarded as a defoaming device for separating air bubbles from a slurry or liquid. Such a defoaming device is also included in the present invention.

Note that the dispersing device and the defoaming device of the present invention are not limited to the above-described embodiments. Various changes can be made thereto without departing from the scope of the present invention.

The invention claimed is:

1. A dispersing device comprising:

a casing having at least a liquid inlet opening that is an inlet for a liquid;

a rotating body pivotably attached to a rotating shaft and rotating around the rotating shaft, the rotating body having first and second ends outwardly opposite to each other along a rotating axis of the rotating shaft, the rotating body being accommodated in the casing, the second end being located closer to the liquid inlet opening than the first end;

a liquid channel having:

a passage opening through which the liquid supplied from the liquid inlet opening passes on the second end of the rotating body; and a segment extending radially outwardly from the rotating axis along a direction from the second end toward the first end of the rotating body in an interior of the rotating body, a cross section perpendicular to the rotating axis of the segment being annular, an outer diameter of the cross section of the segment next to the first end of the rotating body being larger than an outer diameter of the cross section of the segment next to the second end of the rotating body;

at least one connecting hole provided in the rotating body configured to connect the liquid channel with an exterior of the rotating body on a downstream side of the liquid channel; and an interspace channel formed between an outermost periphery of the rotating body and the casing, the interspace channel being in fluid communication with the at least one connecting hole, the interspace channel being configured to exert a shear force on the liquid passing therethrough to disperse particles in the liquid.

2. The dispersing device according to claim 1, wherein the rotating body, the liquid channel, and the connecting hole together constitute a pump.

3. The dispersing device according to claim 1, wherein a cross section of the liquid channel perpendicular to the rotating shaft increases toward a downstream of the liquid channel.

4. The dispersing device according to claim 1, wherein the rotating body is configured with a first rotating body and a second rotating body that are rotatable around the rotating shaft in an integrated manner;

the first rotating body has a hollow space having an open end to an outside;

the second rotating body is disposed in the hollow space;

the passage opening is formed by the open end of the hollow space; and the liquid channel is constituted of a space formed between an outer circumferential surface of the second rotating body and an inner circumferential surface of the first rotating body.

5. The dispersing device according to claim 4, wherein the first rotating body is formed in a hollow cylindrical generally circular truncated cone shape, is provided with the passage opening provided in a base of the cylindrical generally circular truncated cone shape having a smaller diameter, and is provided with at least one hole that penetrates through a circumferential wall; of the first rotating body, the second rotating body is formed in a generally circular truncated cone shape or a circular cone shape, the connecting hole is formed by the hole, and the liquid channel has a cylindrical circular truncated cone-shaped space extending toward the first end of the rotating body along the rotating axis.

6. The dispersing device according to claim 5, wherein a width of an inlet of the cylindrical circular truncated cone-shaped space in a first direction orthogonal to the inner circumferential surface of the first rotating body or the outer circumferential surface of the second rotating body is smaller than or equal to approximately 15% of a first diameter of a base of the first rotating body having a larger diameter, and a width of an outlet of the cylindrical circular truncated cone-shaped space in the first direction is larger than or equal to approximately 3% of the first diameter of the base of the first rotating body.

7. The dispersing device according to claim 1, wherein the interspace channel is located closer to the first end of the rotating body than the connecting hole along the rotating axis.

8. The dispersing device according to claim 1, wherein the casing has a first liquid discharge opening adjacent to an outlet opening of the interspace channel, and the casing has a second liquid discharge opening adjacent to an inlet opening of the interspace channel.

9. The dispersing device according to claim 8, wherein the interspace channel includes a segment in which a channel width becomes narrower as approaching to the outlet opening of the interspace channel.

10. The dispersing device according to claim 1, wherein an inner surface of the interspace channel includes.

11. The dispersing device according to claim 1, wherein a channel width of the interspace channel is in a range of 0.05 to 10 mm.

12. The dispersing device according to claim 1, further comprising a rotating driver configured to rotate the rotating body via the rotating shaft, wherein the rotating body rotates at a circumferential velocity in a range of 1 to 200 m/s.

13. The dispersing device according to claim 1, further comprising a divider that extends in a channel width direction of the liquid channel within the liquid channel.

14. A defoaming device comprising:

a casing having at least a liquid inlet opening that is an inlet for a liquid;

a rotating body pivotably attached to a rotating shaft and rotating around the rotating shaft, the rotating body having first and second ends outwardly opposite to each other along a rotating axis of the rotating shaft, the rotating body being accommodated in the casing, the second end being located closer to the liquid inlet opening than the first end;

a liquid channel, having:

a passage opening through which the liquid supplied from the liquid inlet opening passes on the second end of the rotating body; and a segment extending radially outwardly from the rotating axis along a direction from the second end toward the first end of the rotating body in an interior of the rotating body, a cross section perpendicular to the rotating is axis of the segment being annular, an outer diameter of the cross section of the segment next to the first end of the rotating body being larger than an outer diameter of the cross section of the segment next to the second end of the rotating body;

at least one connecting hole provided in the rotating body for connecting the liquid channel with an exterior of the rotating body on a downstream side of the liquid channel; and an interspace channel formed between an outermost periphery of the rotating body and the casing, the interspace channel being in fluid communication with the at least one connecting hole, the interspace channel being configured to exert a shear force on the liquid passing therethrough to defoam the liquid.

15. The dispersing device according to claim 1, wherein the casing has a first liquid discharge opening provided at a downstream side of an outlet opening of the interspace channel, and the liquid that has passed through the interspace channel is discharged to an outside via the first liquid discharge opening, the casing has a second liquid discharge opening provided at an upstream side of an inlet opening of the interspace channel, and the liquid that has passed through the liquid channel and the connecting hole is discharged to an outside via the second liquid discharge opening.

16. The dispersing device according to claim 15, further comprising:

a first valve configured to open and close the first liquid discharge opening; and a second valve configured to open and close the second liquid discharge opening.

* * * * *